United States Patent [19]

Keijer

[11] 4,034,645

[45] July 12, 1977

[54] METHOD FOR MANUFACTURING A GEAR-WHEEL FOR A ROTARY DISPLACEMENT MACHINE

[75] Inventor: Jan Tonnis Keijer, Rosmalen, Netherlands

[73] Assignee: Grasso's Koninklijke Machinefabrieken N.V., s-Hertogenbosch, Netherlands

[21] Appl. No.: 592,198

[22] Filed: July 1, 1975

[30] Foreign Application Priority Data

July 2, 1974  Netherlands ............... 7408947

[51] Int. Cl.$^2$ .......................... B23F 5/20
[52] U.S. Cl. .......................... 90/4; 90/3; 90/5
[58] Field of Search ............ 90/3, 4, 9, 5, 9.4, 90/9.6; 29/103 B

[56] References Cited

U.S. PATENT DOCUMENTS

| | | | |
|---|---|---|---|
| 1,431,155 | 10/1922 | England | 90/4 |
| 1,934,754 | 11/1933 | Wildhaber | 90/3 |
| 3,812,760 | 5/1974 | Wildhaber | 90/3 |

FOREIGN PATENT DOCUMENTS 645,533  11/1950  United Kingdom ............... 90/3

*Primary Examiner*—Francis S. Husar
*Assistant Examiner*—William R. Briggs
*Attorney, Agent, or Firm*—Finnegan, Henderson, Farabow & Garrett

[57] ABSTRACT

An apparatus and method for shaping the teeth on a gear wheel to conform in a close sealing fit with the teeth of a globoid worm wherein a gear wheel blank and tool holder are supported for rotation about non-intersecting, mutually perpendicular axes, the tool holder axis lying in a plane which passes between the front and rear faces of the gear wheel blank. A pair of cutting tools are mounted 180° apart on the tool holder and have cutting edges which extend radially out from the tool holder axis, the two edges being axially separated by a distance equal to the width of a gear wheel tooth. The blank and tools are rotated at velocities which are related by the same ratio as the velocities at which the gear wheel and worm are intended to operate and at the same time the tool holder and blank are fed toward one another, whereupon both sides of the gear wheel teeth are machined in one continuous sequence of undirectional rotational movements.

2 Claims, 5 Drawing Figures

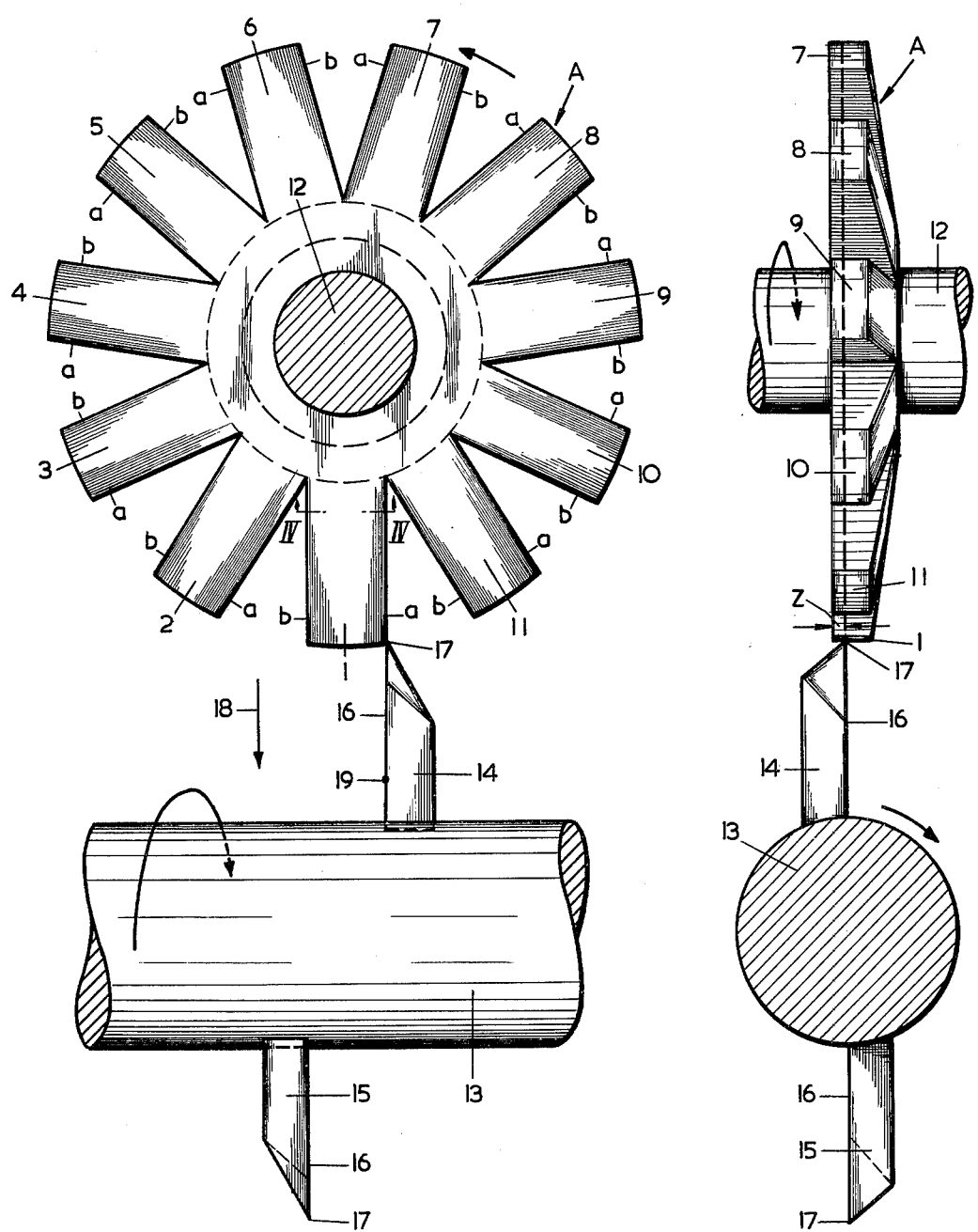

METHOD FOR MANUFACTURING A GEAR-WHEEL FOR A ROTARY DISPLACEMENT MACHINE

The present invention relates to a method for manufacturing and/or machining a gearwheel destined to cooperate sealingly with a globoid worm in a rotary displacement machine, such as a compressor for compressing a gaseous medium.

Such machines are well known in the literature and may operate as a compressor, a pump or a motor. As an example there may be cited the U.S. Pat. No. 3,133,695 in which a compressor is described. In such a compressor it is necessary to bring about the best possible sealing in the cooperation between gearwheel and driven globoid worm. For this sealing a lubricant is used. The better the sealing between gearwheel and worm, the better the efficiency of the compressor.

It will be clear that the teeth of the gearwheel have a rather complicated configuration and consequently the manufacture of the gearwheel has presented so far quite some difficulties. Up till now the gearwheel was cast in the ultimate shape and thereafter ground but this requires a very complicated and therefore expensive casting mould and an expensive machining in order to arrive at the desired accuracy.

A method has now been invented according to which the gearwheel can be manufactured by cutting out of an entirely full disc or a roughly preformed disc. The latter is to be preferred. Preforming of the gearwheel can be effected by casting or milling.

The method according to the invention is characterized in that a full, or a preformed gearwheel-shaped, disc-like workpiece is rotary driven about a shaft, that at least one cutting tool is rotary about a center line perpendicular to the center line of the workpiece and lying in a plane passing between the front and rear faces of the workpiece, that the tool has a cutting edge located on a radius extending from the axis of tool rotation, that the driving speeds of the tool and the workpiece have the same ratio as the transmission between gearwheel and globoid worm in the displacement machine, and that during the manufacture and/or machining the center lines are stepwise and continuously moved towards one another. The driving speeds for the tool and the gearwheel-shaped workpiece are determined as a function of the number of teeth on the gearwheel and the number of threads on the globoid worm with which it is to be mated. That is, if the gearwheel workpiece has $x$ number of teeth and the worm has $y$ number of threads, the workpiece is rotated at a predetermined multiple of $y$ revolutions per minute and the tool is rotated at the same predetermined multiple of $x$ revolutions per minute.

The invention is based on the insight that by the correlated rotary drive of the shaft on which the gearwheel is mounted and the rod that takes the place of the globoid worm, and the continuous or intermittent movement towards one another of both centre lines each tooth flank is completely machined in the end.

The invention will now be further explained with reference to the drawings in which FIG. 1 is a diagrammatical front view of the apparatus according to the invention with a preformed gearwheel thereon;

FIG. 2 is a diagrammatical side view of the apparatus according to FIG. 1;

Figure 3:
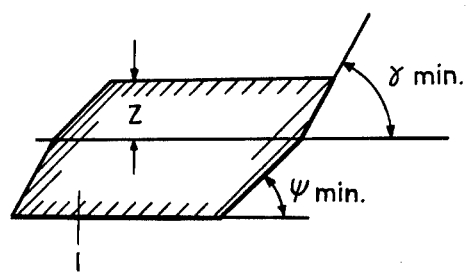
FIG. 3 is a front view of the tooth top of a machined gearwheel.

In FIG. 1 the preformed gearwheel A comprises 11 teeth numbered 1 to 11 incl. This number has been selected at will. Furthermore it is assumed that the globoid worm (not shown) of the rotary displacement machine has six threads, this has also been selected at will. The transmission ratio in the rotary displacement machine is then 11:6, which means that the worm effects 11 revolutions against the gearwheel's 6. If this transmission ratio has been selected, then the same transmission ratio should be applied in the manufacture and/or machining of the gearwheel.

The gearwheel A is mounted on a rotary shaft or arbor 12.

The center line of a rod or tool holder 13 crosses the center line of the shaft 12 preferably according to an angle 90°.

On the rod 13 there is mounted at least one radial cutting knife 14. In FIG. 1 and 2 a second cutting knife 15 is shown, in opposite radial position, but staggered relative to the cutting knife 14.

In the following text only the cutting knife 14 will be discussed. The cutting knife 15 is mainly identical, the difference will be mentioned later on.

In fact the cutting knife 14 requires only one infinitely thin cutting edge, designated by 16, the point of the cutting edge being designated by 17. It is obvious that for reasons of practice this is not possible and consequently the cutting knife 14 presents a certain thickness and width. However, for the invention only the cutting edge 16 with the point 17 are of importance.

The shaft 12 is driven at a multiple of 6 r.p.m. and the rod 13 at the same multiple of 11 r.p.m.

Initially the center lines are located so far apart that the point 17 of the cutting knife 14 just does not touch the peripheral surface of the gearwheel A.

During machining the shaft 12 and the rod 13 are rotary in the direction shown and the shaft 12 with the gearwheel A moves, moreover, linearly in the direction of the arrow 18.

Let us assume that the point 17 of the cutting knife 14 just reaches its cutting position. The flank $a$ of tooth 1 is cut by the point 17 according to an angle of $\gamma$ min, see FIG. 3.

From the transmission ratio it appears that after half a revolution of the rod 13 and after 3/11 revolution of the shaft 12 the tooth 4 of the gearwheel A is cut by the cutting knife 15 at the flank $b$.

If the rod 13 has effected a complete revolution and the shaft 12, 6/11 revolution, the tooth 7 is cut at the flank $a$.

When all teeth 1 to 11 incl. have been cut once at each flank, the rod 13 and the shaft 12 have made 11 and 6 revolutions respectively.

The shaft 12 is then moved over a small distance in the direction of the rod 13, according to the arrow 18.

This linear movement takes place every time when the rod 13 has carried out 11 revolutions.

Said movement continues until the center-to-center distance between gearwheel and worm in the machine for which the gearwheel is destined.

Figure 4:
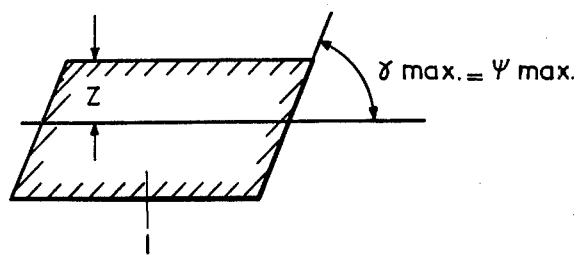
FIG. 4 is a section through a tooth of a machined gearwheel taken according to the line IV—IV in FIG. 1.

The point 17 of the cutting tool 14 then cuts according to an angle $\gamma$ max, see FIG. 4.

This angle $\gamma$ has therefore changed in value. The reason for this is that the foot of the tooth (FIG. 4) is located much closer to the center line of the shaft 12 than the top of the tooth (FIG. 3). This means that the top of the tooth has a greater speed in the plane of the gearwheel than the foot of the tooth.

The angle according to which the point 17 cuts the tooth flank therefore changes continuously from $\gamma$ min. to $\gamma$ max.

Naturally not only the point 17 cuts the tooth flank but the entire cutting edge 16 does so. When the point 17 has reached the tooth foot, see FIG. 4, then the tooth top is cut by the point 19 of the cutting edge 16.

In this point 19 the speed at which the cutting knife 14 rotates is much less than the speed of the point 17 of the cutting knife 14 so that the tooth top is cut according to a smaller angle $\psi$ min.

Accordingly as the shaft 12 approaches the rod 13, an increasing portion of the cutting edge becomes operative and forms also a cut changing from $\psi$ min. to $\psi$ max (= $\gamma$ max.).

Figure 5:
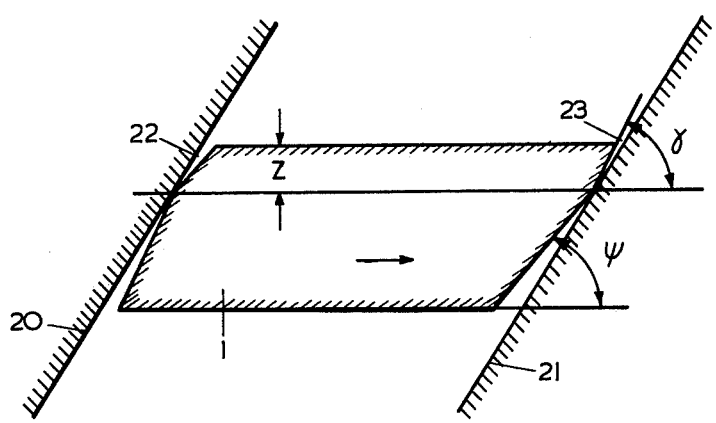
FIG. 5 shows in section the cooperation between a tooth of a gearwheel and the tooth flanks of a globoid worm in a rotary displacement machine, viewed on a predetermined radius.

As is apparent from FIG. 2 the center of rod 13 is positioned at a distance of $z$ from the surface of the gearwheel A. This distance amounts to a few mm. This distance is also shown in FIG. 3, 4 and 5. Thus, as is clearly evident from FIG. 2 the center line of rod 13 lies in a plane that passes between the front and rear faces of the gearwheel blank.

In FIG. 5 there is shown on a somewhat larger scale than FIG. 3 and 4 a section through the tooth 1, on a certain radius. The tooth flanks of the worm are designated by 20 and 21. As is apparent from FIG. 5 the existence of the distance $z$ forms oil wedges 22 and 23 so that a very good lubrication and also a very good sealing is obtained between the flanks of the teeth of the gearwheel and the flanks of the threads of the globoid worm without a metal-to-metal contact.

In order to obtain a certain amount of running clearance it is preferred to take the distance between the points of the cutting knives 14 and 15 slightly greater than the worm diameter, the ultimate center distance between shaft 12 and rod 13 being slightly reduced. In this way the angles $\gamma$ are somewhat increased and the angle $\psi$ somewhat reduced.

The cutting knife 15 is identical to the cutting knife 14 as regards the point 17 and the cutting edge 16. The thickness and width, however, are somewhat different because each knife should fit between the teeth of the gearwheel A.

It will be apparent to those skilled in the art that various modifications and variations could be made in the method of the invention without departing from the scope or spirit of the invention.

I claim:

1. A method for shaping the teeth of a gearwheel blank to conform in a close sealing fit with the threads of a globoid worm, said gearwheel blank having $x$ number of teeth and said worm having $y$ number of threads, said method comprising the steps of:

supporting a gearwheel blank for rotation about a first axis;

supporting a cutting tool for rotation about a second axis, said tool having a cutting edge oriented substantially along a radius extending from said second axis, said second axis being located in a plane passing between the front and rear faces of said gearwheel blank and perpendicular to said first axis;

rotating said blank about said first axis at a predetermined multiple of $y$ revolutions per minute; and rotating said tool at the same predetermined multiple of $x$ revolutions per minute about said second axis while simultaneously feeding said blank and said tool toward one another, whereby said tool shapes the flanks on a first of the sides of the teeth on said gearwheel blank.

2. A method for shaping the teeth of a gearwheel blank to conform in a close sealing fit with the threads of a globoid worm, said gearwheel blank having $x$ number of teeth and said worm having $y$ number of threads, said method comprising the steps of:

supporting a gearwheel blank for rotation about a first axis;

supporting a first cutting tool for rotation about a second axis, said tool having a first cutting edge oriented substantially along a radius extending from said second axis, said second axis being located in a plane passing between the front and rear faces of said gearwheel blank and perpendicular to said first axis;

supporting a second cutting tool for rotation about said second axis, said second tool having a second radial cutting edge spaced from said first cutting edge by a distance along said second axis substantially equal to the width of a gearwheel tooth;

rotating said blank about said first axis at a predetermined multiple of $y$ revolutions per minute; and rotating said tools at the same predetermined multiple of $x$ revolutions per minute about said second axis while simultaneously feeding said blank and said tools toward one another, whereby said tools shape the flanks on both sides of the teeth on said gearwheel blank.

* * * * *